UNITED STATES PATENT OFFICE.

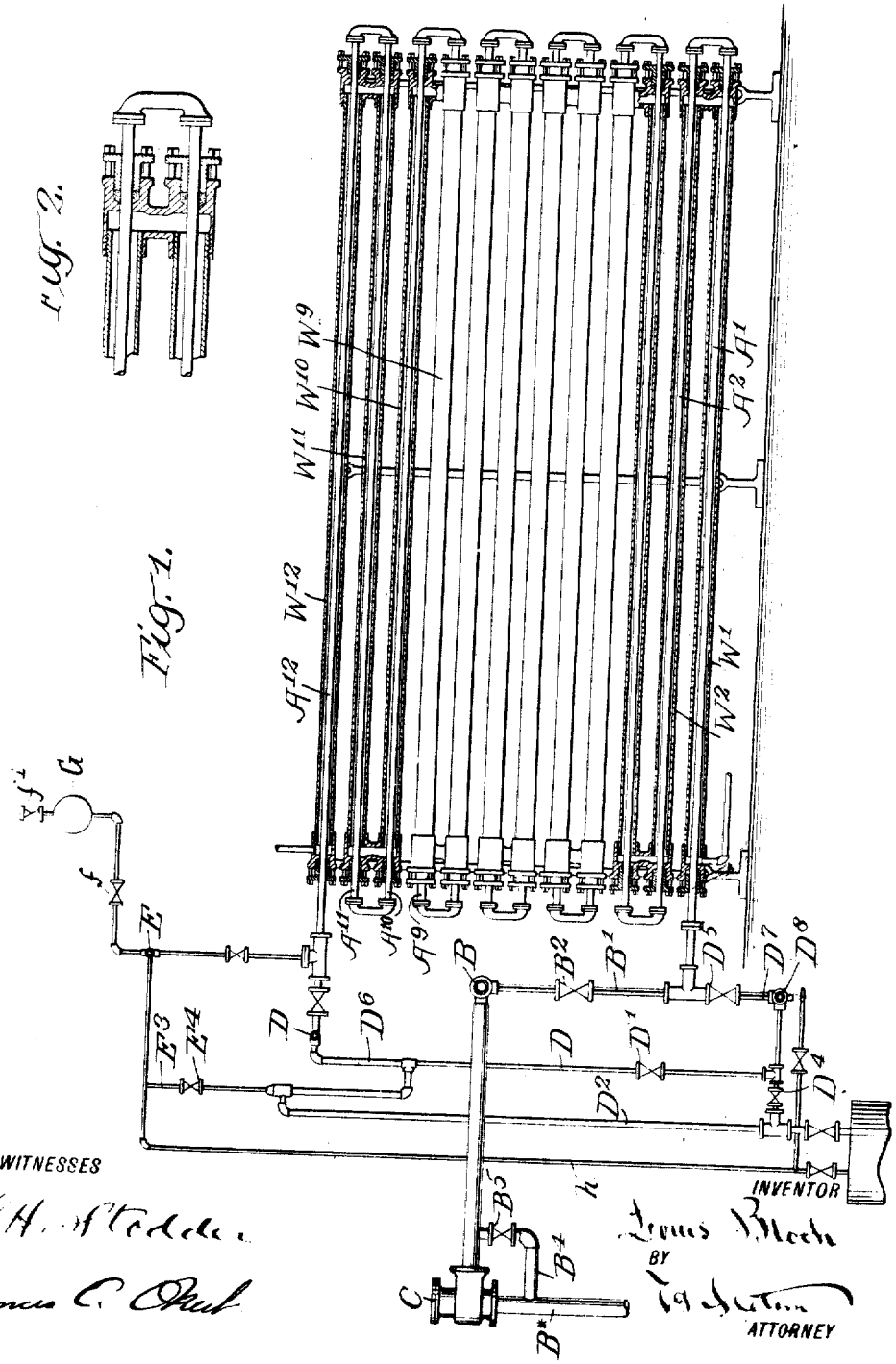

LOUIS BLOCK, OF MAMARONECK, NEW YORK.

CONDENSER FOR AMMONIA.

1,210,142.  Specification of Letters Patent.  Patented Dec. 26, 1916.

Application filed December 2, 1912. Serial No. 734,651.

*To all whom it may concern:*

Be it known that I, LOUIS BLOCK, a citizen of the United States, residing at Mamaroneck, in the State of New York, doing business in New York city, in said State, have invented a certain new and useful Improvement in Condensers for Ammonia, of which the following is a specification.

My improvement is in the line of what are sometimes known as "double pipe" condensers, having the advantage of flowing water longitudinally of the several pipes containing the ammonia gas to be condensed. It has been common to put the ammonia through the annular space between the inside and outside tube. I reverse that condition. I flow the ammonia through the smaller inside tube and flow the water through the annular space between the inside pipe and the outside one. It is common to put the ammonia in at the upper end and the water at the lower end of the "double-pipe" thus formed. I reverse those conditions.

I have, in an earlier application for a patent, developed a discovery realizing a great gain in putting the ammonia in at the bottom in the gaseous form and having it mingle with the liquefied ammonia which is produced as it goes through the condenser, retaining such liquid and having the proportion of liquid increase from the bottom upward, flowing out at the top or near the top in the form of completely condensed ammonia. It was based on the discovery that the velocity with which gas enters at the lower end is sufficient by its momentum to force the mixture upward notwithstanding the increasing weight due to the condensation. I find it is practicable to apply the same method to the double pipe condenser. That is one purpose of the present invention.

The following is a description of what I consider the best means of carrying out the invention. The accompanying drawings from a part of this specification.

Figure 1 is a longitudinal vertical section through one of the coils. There may be any required number side by side. I will assume that there are four. They are alike. A description of one will suffice for all. Fig. 2 is a corresponding section of a part on a larger scale.

Similar letters of reference indicate corresponding parts in both the figures.

$A^1$, $A^{12}$, etc., are pipes arranged in the zigzag position, joined by proper return bends, constituting what is sometimes termed a trombone coil. It is not essential that they shall be in this relation, but the trade is accustomed to employing condensers in that form and there is no objection to it. These pipes $A^1$, $A^2$, etc., are a sufficient distance apart to allow for the larger pipe to inclose each. $W^1$, $W^{12}$, etc., are larger and somewhat shorter pipes, applied to inclose the pipes $A^1$, etc., in the manner long known in double pipe condensers. They are somewhat shorter and are joined by efficient return bends allowing a continuous flow of water entering at the top or near the top and traversing along the annular space between the two pipes and back again flowing downward at each return and being delivered at the bottom.

The warm ammonia gas passes through check valve C, header B and pipes $B^1$ and enters the inside pipe at the bottom. It flows continuously through the inside pipes $A^1$, etc., and first gives up its superheat and then its latent heat and becomes condensed. The water flows downward through the annular space between the pipes, and the ammonia flows upward through the inner pipe. There is a very perfect application of the principle of counter-current heat-exchanging.

The ammonia enters at the bottom and traverses the pipes $A^1$, $A^{12}$, etc., upward. The first effect is to part with the superheat to the now pretty thoroughly warmed descending water in the space surrounding the inside pipe. As it rises farther the ammonia commences to be condensed and a larger and larger proportion assumes the liquefied form with each traverse. All is retained for a time within the pipes and is made to perform a very important function in the fact of its mingling with the gaseous ammonia and serving as a condensing medium therein, its active agitation carrying it at rapidly succeeding intervals into contact with the metal of the inclosing pipe. Before reaching the top it is all condensed and one or more traverses at the top is entirely devoted to cooling the liquefied ammonia which is being conveyed away through trap $D^6$ and pipe $D^2$.

Liquefied ammonia is present in liberal quantities in all the upper pipes and in all the pipes at mid-height of the several coils, but the lower pipes in each coil are not sufficiently supplied with the liquefied ammonia by the condensation which is just commencing there. I provide for introducing a small quantity of liquefied ammonia controllable at will into the lower part of each coil, using for that purpose some of the liquefied ammonia which has been produced a few seconds earlier and is otherwise flowing away. This is done by a pipe D controllable by a valve $D^1$. It receives ammonia from a point in the pipe $D^6$ above, which pipe carries the liquefied ammonia away. This pipe D leads into a header $D^8$ below, which serves two functions. I will designate it by its least important, though at intervals its most conspicuous function, that of draining when it is required to empty the condenser.

The header $D^8$ connects with the descending pipe D and with the liquid ammonia delivery pipe $D^2$, by a short connection controlled by a valve $D^4$, which valve stands usually closed. The pipes $D^7$ each controlled by a valve $D^5$, connects the drain header $D^8$ with low points in the respective trombone coils. The header $D^8$ is ready to serve when required in draining the coil only when the condenser is idle, it is also ready to serve by permitting liquefied ammonia to flow in sufficient quantities up through the valves $D^5$, when the condenser is in operation. This point is a critical one. If too much of the ammonia is allowed to descend through the pipe D, and ascend from the drain header through one or all the valves $D^5$ it will be simply bad economy, simply treating over again the ammonia which had already been sufficiently treated, but if a valve $D^5$ is opened only just enough, it will permit a small flow which will perform an important useful function in mingling with the gaseous ammonia being received and insuring that the mixed condition which is peculiarly efficient, obtains as soon as the gas enters the coil.

The above describes good provisions for counter-current heat-exchanging. What I term a "parallel flow" can be employed instead if preferred. One way to attain such is to introduce the cooling medium at the lower instead of the upper end of the zigzag coils, entering the annular space between the pipes $A^1$, $A^{12}$, etc., and $W^1$, $W^{12}$, etc., at the lower end, moving upward therein and being discharged at the top. This requires more water but avoids the possible objection that the cooling water in becoming heated may release air and form air pockets, when compelled to move downward in the space between the inside pipe $A^1$, etc., and the outside pipe $W^1$, etc.

Modifications: I can use part of the invention without the whole. I do not limit myself to putting the ammonia to be condensed in the inner pipe and the water in the annular space between the inner and outer pipe. The gaseous ammonia may under certain conditions, enter the annular space at the bottom pipe and the water may enter the inner pipe at the top of the condenser, or the water may enter the inner pipe at the bottom; the object being always to intermingle the gaseous with the liquid ammonia, while traveling along the pipes either upward or downward. To avoid air pocketing, I employ the well known means of automatic relief valves, or ordinary vents in the return bends.

I claim as my invention:—

1. A double pipe ammonia condenser comprising a plurality of superimposed horizontally arranged double pipes in the form of an ordinary trombone coil, means arranged to bring the gas from a higher level to a low point in the coils, a check valve for positively preventing any return flow, a passage arranged for taking away the condensed and cooled ammonia, and means for preventing the discharge of uncondensed gas.

2. A double pipe condenser in the form of a plurality of coils side by side, one pipe lying concentrically within the other, a connection for introducing gaseous ammonia at a low point in the inner pipe of each coil, so arranged that it will ascend through the convolutions of the pipe, and means for cooling said gas by the influences of colder water, and means for causing said water to pass in a counter-current to said gas.

3. A double pipe condenser in the form of a plurality of coils side by side, provisions for introducing gaseous ammonia at the bottom, means for retaining the condensed particles as they ascend and means for agitating them during their passage, by non-condensed gas, in combination with a pipe connecting high and low points arranged for leading downward a portion of the contents of the liquefied gas discharge pipe and introducing it again at the bottom, and a controlling valve and means for operating it to determine the quantity thus used.

4. An ammonia condenser having double tubes arranged one above the other and connected at their ends to form a continuous coil, means for delivering a gas to the lowermost end of said coil of inner tubes from a point above said lowermost end, and means for passing a portion of said condensed gas from the upper end of the coil of inner tubes and means for causing it to enter the lower end of said coil of inner tubes.

5. A double pipe counter current condenser having superimposed tubes, means for introducing gas at the lower end of said condenser and means for passing a portion of the condensed gas from the upper end of said condenser to a point lower than the lowermost end of said condenser, and means for introducing it with the gas at the lowermost end of said condenser as specified.

6. A double pipe condenser having superimposed tubes, means for admitting a gas to the lowermost inner tube, means for discharging the condensed gas from the uppermost inner tube, and means for collecting from said condensed gas non-condensable gases.

7. A double pipe condenser having superimposed tubes, means for admitting a gas to the lowermost tube, and means as a pipe $D^6$ for carrying the condensed gas to a point lower than the uppermost inner tube and for delivering it from a point higher than the uppermost inner tube.

8. A double pipe condenser having means for delivering a cooling medium into the outer tubes, means for introducing a gas into the inner tubes to be condensed therein, means for delivering said gas from a point high up in said condenser into a reservoir, and a circuitous passage between said condenser and said reservoir to prevent the escape of non-condensed gases from said condenser.

9. A double pipe condenser having superimposed tubes, means for admitting gas to a lower tube, means for passing a portion of the condensed gas from the upper end of said condenser to the lowermost end of said condenser, means for introducing said condensed gas with the non-condensed gas at the lowermost end of said condenser and means as the valve $D^8$ for draining said condenser, all combined for joint operation as herein specified.

10. A double pipe condenser having superimposed tubes, means for introducing gas at the lower end of said condenser to be condensed therein, means for retaining sufficient quantities of condensed gas within said condenser, and means as the check C and elevated pipe connected therewith to prevent the passage backward of any of the condensed gas from the lower end of said condenser.

Signed at New York city in the county of New York and State of New York this twenty-third day of November A. D. 1912.

LOUIS BLOCK.

Witnesses:
A. A. BUTTERMAN,
J. NEUBECKER.